(No Model.)

C. M. STEARNS.
ELEVATOR.

No. 479,314. Patented July 19, 1892.

WITNESSES:
Chas. Nicol
E. M. Clark

INVENTOR:
C. M. Stearns
BY Munn & Co.
ATTORNEYS

UNITED STATES PATENT OFFICE.

COLLINS M. STEARNS, OF MILWAUKEE, WISCONSIN, ASSIGNOR TO HIMSELF, EMIL JOHN FIELD, AND THOMAS FIELD, OF SAME PLACE.

ELEVATOR.

SPECIFICATION forming part of Letters Patent No. 479,314, dated July 19, 1892.

Application filed December 18, 1891. Serial No. 415,533. (No model.)

*To all whom it may concern:*

Be it known that I, COLLINS MONROE STEARNS, of Milwaukee, in the county of Milwaukee and State of Wisconsin, have invented a new and Improved Elevator, of which the following is a full, clear, and exact description.

The object of the invention is to provide a new and improved elevator which is simple and durable in construction and very effective in operation, combining safety with high speed.

The invention consists of fixed screw-posts, gear-wheel nuts mounted to turn on the said posts and supporting the cage, and revoluble shafts fluted to form long pinions in mesh with the said gear-wheels.

The invention also consists of certain parts and details and combinations of the same, as will be fully described hereinafter, and then pointed out in the claims.

Reference is to be had to the accompanying drawings, forming a part of this specification, in which similar letters of reference indicate corresponding parts in all the figures.

Figure 1:
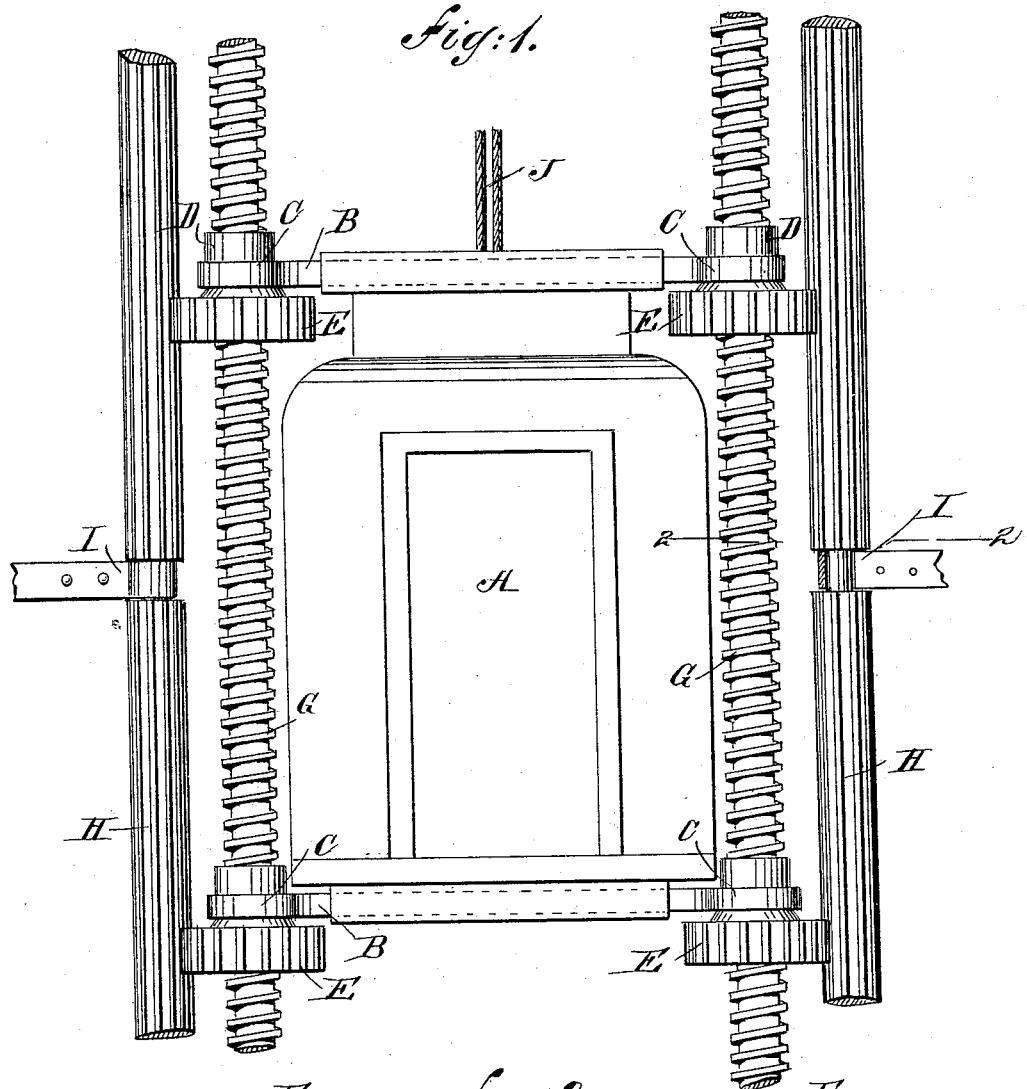
Figure 2:
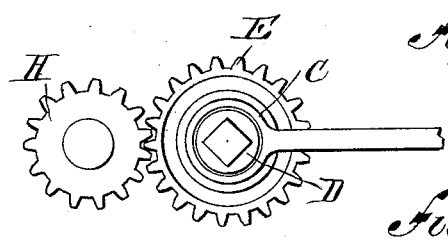
Figure 3:
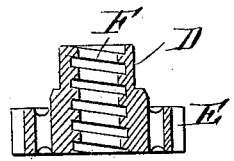

Figure 1 is a side elevation of the improvement with part in section. Fig. 2 is a plan view of the same, with part in section, on the line 2 2 of Fig. 1; and Fig. 3 is a sectional side elevation of one of the gear-wheel nuts.

The elevator carriage or cage A carries on the top and bottom a bar B, formed at its ends with eyes C, fitting loosely on the hubs D of gear-wheels E, each being formed with screw-threads F, engaging screw-rods G, arranged vertically and secured at their ends in suitable bearings in the building in which the elevator is located.

The two gear-wheel nuts E, located on the same fixed screw-posts G, mesh in a shaft H, fluted lengthwise to form a pinion mounted to revolve in suitable bearings I and driven from suitable machinery, so that the rotary motion of these pinions rotates the gear-wheel nuts E, which thus travel up and down on the fixed screw-posts G, according to the direction in which the pinions are revolved. The cage A, as illustrated in Fig. 1, is also connected with the usual hoisting-ropes J, so that the lifting of the cage is not entirely dependent on the gear-wheel nuts E when the latter rotate and travel up or down on the screw-rods G.

It will be understood that the long pinions H are rotated simultaneously, so that the several gear-wheel nuts E travel up and down at the same rate of speed on the fixed screw-posts G.

Having thus fully described my invention, I claim as new and desire to secure by Letters Patent—

1. In an elevator, the combination, with fixed screw-posts, of gear-wheel nuts mounted to turn on the said posts and adapted to support the cage and revoluble shafts fluted to form long pinions in mesh with the said gear-wheel nuts, substantially as shown and described.

2. In an elevator, the combination, with a cage provided with bars having eyes, of gear-wheel nuts engaged at their hubs by the eyes of the said bars, fixed screw-posts on which said nuts turn, and revoluble shafts fluted to form long pinions in mesh with the said gear-wheel nuts, substantially as shown and described.

COLLINS M. STEARNS.

Witnesses:
W. G. PARSONS,
E. B. PARSONS.